(12) United States Patent
Barkan et al.

(10) Patent No.: US 7,475,821 B2
(45) Date of Patent: Jan. 13, 2009

(54) SCANNER AND METHOD FOR ELIMINATING SPECULAR REFLECTION

(75) Inventors: Edward Barkan, Miller Place, NY (US); Howard Shepard, Great River, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 11/735,676

(22) Filed: Apr. 16, 2007

(65) Prior Publication Data

US 2007/0181692 A1   Aug. 9, 2007

Related U.S. Application Data

(63) Continuation of application No. 10/930,651, filed on Aug. 31, 2004, now Pat. No. 7,204,420.

(51) Int. Cl.
  *G06K 7/10* (2006.01)
  *G06K 7/14* (2006.01)
  *G08C 21/00* (2006.01)
  *H02P 1/00* (2006.01)

(52) U.S. Cl. ............ 235/454; 235/455; 235/462.06; 235/462.3

(58) Field of Classification Search ............ 235/454, 235/455, 462.06, 462.3
See application file for complete search history.

(56) References Cited

U.S. PATENT DOCUMENTS

| 5,149,948 | A | * | 9/1992 | Chisholm | 235/462.06 |
|---|---|---|---|---|---|
| 5,177,346 | A | * | 1/1993 | Chisholm | 235/462.06 |
| 5,347,114 | A | * | 9/1994 | Tanaka | 235/462.07 |
| 5,811,777 | A | * | 9/1998 | Ackley | 235/462.01 |
| 5,825,010 | A | * | 10/1998 | Charych et al. | 235/472.01 |
| 5,942,762 | A | * | 8/1999 | Hecht | 250/556 |
| 6,147,358 | A | * | 11/2000 | Hecht | 250/566 |
| 37,165 | A1 | * | 3/2001 | Okamoto | 235/462.43 |
| 6,323,503 | B1 | * | 11/2001 | Hecht | 250/566 |
| 6,572,017 | B1 | * | 6/2003 | Stoner | 235/462.12 |
| 6,712,270 | B2 | * | 3/2004 | Leach | 235/454 |
| 7,204,420 | B2 | * | 4/2007 | Barkan et al. | 235/462.01 |
| 7,219,843 | B2 | * | 5/2007 | Havens et al. | 235/462.42 |
| 2001/0019078 | A1 | * | 9/2001 | Ackley | 235/462.01 |
| 2002/0094484 | A1 | * | 7/2002 | Buchsbaum et al. | 430/7 |
| 2003/0192949 | A1 | * | 10/2003 | Hattersley et al. | 235/462.43 |
| 2003/0222144 | A1 | * | 12/2003 | Meier et al. | 235/454 |
| 2004/0031848 | A1 | * | 2/2004 | Leach | 235/454 |

(Continued)

FOREIGN PATENT DOCUMENTS

JP   2008065528 A   *   3/2008

(Continued)

*Primary Examiner*—Daniel Walsh
(74) *Attorney, Agent, or Firm*—Fay Kaplun & Marcin, LLP

(57) ABSTRACT

Described is a scanner for reading an optical code which includes a light transmission system and an image acquisition system. The light transmission system projects light on a target. The image acquisition system receives light reflected from the target to generate an image of the target. The image acquisition system is arranged to receive the light reflected from the target at a plurality of angles so that, when specular reflection of the target is associated with a first of the plurality of angles, light from a second one of the plurality of angles is available to minimize image degradation associated with the specular reflection.

19 Claims, 6 Drawing Sheets

U.S. PATENT DOCUMENTS

| | | | |
|---|---|---|---|
| 2004/0164165 A1* | 8/2004 | Havens et al. | 235/462.43 |
| 2005/0103864 A1* | 5/2005 | Zhu et al. | 235/462.42 |
| 2005/0279836 A1* | 12/2005 | Havens et al. | 235/472.01 |
| 2006/0043194 A1* | 3/2006 | Barkan et al. | 235/462.45 |
| 2006/0249581 A1* | 11/2006 | Smith | 235/454 |
| 2006/0255144 A1* | 11/2006 | Meier et al. | 235/454 |
| 2006/0283952 A1* | 12/2006 | Wang | 235/462.01 |
| 2007/0181692 A1* | 8/2007 | Barkan et al. | 235/462.41 |

FOREIGN PATENT DOCUMENTS

| | | |
|---|---|---|
| WO | WO03/102859 | 12/2003 |

\* cited by examiner

SCANNER AND METHOD FOR ELIMINATING SPECULAR REFLECTION

The present application is a Continuation application of U.S. patent application Ser. No. 10/930,651 filed Aug. 31, 2004 now U.S. Pat. No. 7,204,420 Entitled "Scanner and Method for Eliminating Specular Reflection". The entire disclosure of the application is expressly incorporated herein by reference.

BACKGROUND INFORMATION

Projection imaging scanners are well established tools for bar code data entry in retailing and other industries. Some projection imaging scanners use laser technology to read bar codes. A laser projection imaging scanner generally uses a rotating polygon to scan a laser beam across an array of stationary mirrors and project a complex pattern of scan lines out into space in front of the scanner housing. This enables omnidirectional scanning of bar codes presented to the scanner or swiped across the face of the scanner. An example of this type of scanner is the LS-9100 available from Symbol Technologies, Inc.

A conventional projection imaging scanner generally works well on universal product code ("UPC") bar codes and reduced space symbology ("RSS") bar codes. However, such a projection imaging scanner does not perform well on some non-UPC bar codes (e.g., Code 39 and Code 128, and two-dimensional bar codes). An area scanners is therefore required to read such bar codes. Such an area scanner generally requires a specialized camera connected to computer which processes a received image of the bar code to identify and decode the bar code.

A bar code placed on a glossy material also cause performance problems for projection imaging scanners. Such a specular reflection, or glare where a light source reflects off a surface and into the optics of the scanner, often causes difficulty when reading such bar codes. Specular dead zones may obscure the bar code and prevent the image scanner from reading the bar code on its first attempt.

SUMMARY

The present invention relates to a scanner for reading an optical code. The scanner includes a light transmission system and an image acquisition system. The light transmission system projects light on a target. The image acquisition system receives light reflected from the target to generate an image of the target. The image acquisition system is arranged to receive the light reflected from the target at a plurality of angles so that, when specular reflection of the target is associated with a first of the plurality of angles, light from a second one of the plurality of angles is available to minimize image degradation associated with the specular reflection.

DETAILED DESCRIPTION

The present invention is directed to an imaging scanner which is capable of reading encoded data and, in particular, a scanner for scanning non-UPC and two-dimensional bar codes, and bar codes on glossy materials.

Figure 1:
FIG. 1 shows an exemplary embodiment of one-dimensional bar code.
Figure 2:
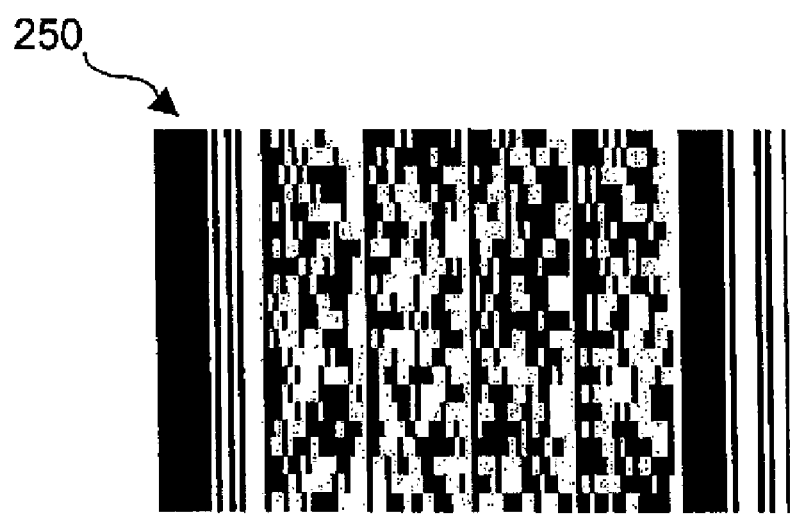
FIG. 2 shows an exemplary embodiment of a two-dimensional bar code.

FIGS. 1 and 2 show an exemplary embodiment of encoded data. In particular, FIG. 1 shows a one-dimensional bar code 150 (e.g., optical code) which includes a single row of parallel bars 152 containing encoded data (e.g., information). Generally, all the data contained in the one-dimensional bar code 150 is encoded in the horizontal width. As one or ordinary skill in the art would understand, increasing the data content of the one-dimensional bar code 150 may be achieved by increasing the width of the bar code 150 (e.g, adding one or more parallel bars 152).

FIG. 2 shows an exemplary embodiment of a two-dimensional bar code 250 (e.g., a PDF 417 type two-dimensional bar code). Data encoded in the two-dimensional bar code 250 is in both the horizontal and vertical dimensions. As more data is encoded, the size of the bar code 250 may be increased in both the horizontal and vertical directions, thus maintaining a manageable shape for ease of scanning. As one of ordinary skill in the art will understand, two-dimensional bar codes (e.g., the bar code 250) differ from one-dimensional or linear bar codes (e.g., the bar code 150), in that they have the ability for higher data content, small size, data efficiency and error correction capability.

Figures 3A, 3B:
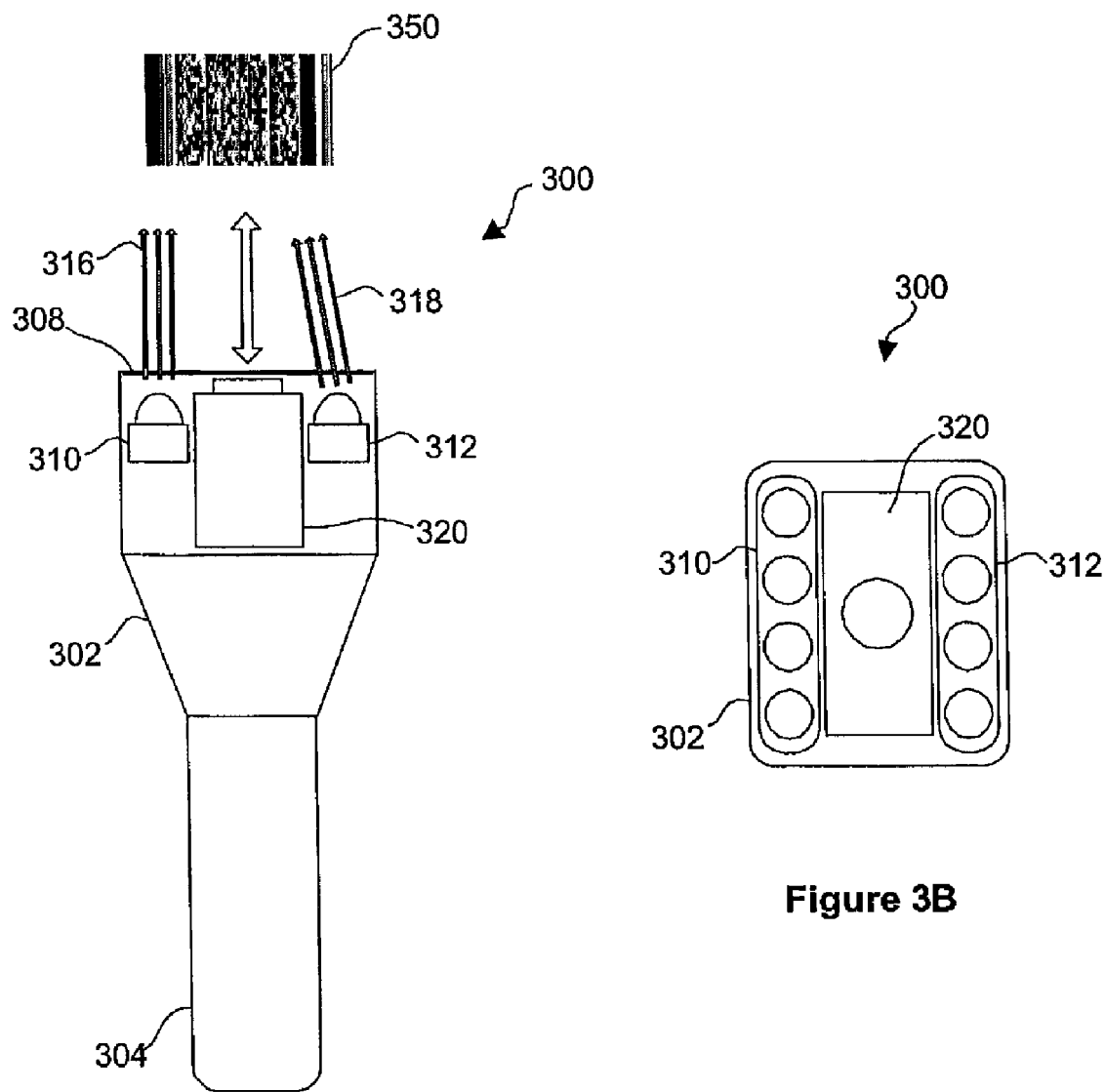
FIG. 3A shows a perspective view of an exemplary embodiment of an imaging scanner according to the present invention.
FIG. 3B shows an end view of the exemplary embodiment of the imaging scanner illustrated in FIG. 3A.

FIGS. 3A and 3B show an exemplary embodiment of an imaging scanner 300 according to the present invention. The imaging scanner 300 includes a housing 302 which may be of any shape and size, and adapted to any specific application. For example, the housing 302 of the exemplary embodiment may be optimized for a handle-held application and include a handle 304.

The imaging scanner 300 may include a window 308 which may be composed of any substantially transparent material. In some exemplary embodiments, the window 308 may be a polarized material. Within the housing 302, the imaging scanner 300 may include a first illumination source 310 and at least one second illumination source 312. The combination of the first illumination source 310 and the second illumination source 312 may be referred to as a light transmission system. The illumination sources 310/312 may each be, for example, a series of light emitting diodes ("LED").

The first illumination source 310 may direct a substantial portion of light in a first general direction 316 and the second illumination source 312 may direct a substantial portion of light in a second general direction 318. The first and second directions 316/318 are preferably not equal. For example, light transmitted in the first direction 316 may pass through the window 308 at a different angle (i.e., with reference to the window 308) than light transmitted in the second direction 318. As one of ordinary skill in the art will understand, light transmitted from the first illumination source 310 (e.g., in the direction 316) may therefore reflect of a surface at a different reflection angle than light transmitted at the same surface from the second illumination source 312 (e.g., in the direction 318).

As shown in FIGS. 3A and 3B, the imaging scanner 300 may further include a camera 320 (e.g., an image acquisition system). The camera 320 may be, for example, a digital camera. The camera 320 may also be a charge coupled device ("CCD"). The image scanner 300 may include a processor (not shown) to process information (e.g., images) received by the camera 320.

The imaging scanner 300 may be used to decode or read data/information stored/encoded in a bar code 350 (e.g., a target). The imaging scanner 300 may further be used to read the bar code 350 when a specular reflection is present. For example, the first and second illumination sources 310/312 may each illuminate alternate frames of the bar code 350. The camera 320 may capture (i.e., receive information from) at least two (2) different frames of the bar code 350. The processor of the imaging scanner 300 may compare or stitch together the frames to decode the information stored in the bar code 350.

As one of ordinary skill in the art will understand, the specular reflection may be characterized by the presence of reflected light above a predetermined threshold amplitude. The reflected light may create as a specular dead zone on the bar code 350 that is unreadable by the camera 320. Therefore, some or all of the information stored in the bar code 350 may not be decoded. Changing the orientation of either the camera 320, the first and second illumination source 310/312, or the bar code 350 may eliminate the specular dead zone.

For each bar code 350 read by the image scanner 300, the imaging scanner 300 may capture at least two (2) frames: the first frame illuminated by the first illumination source 310 and the second frame illuminated by the second illumination source 312. The first and second frames may be captured at the same time, or successively. Thus, if one frame is obscured in whole or in part by a specular dead zone, the camera 320 may receive the information from the other frame to decode the bar code 350. Other exemplary embodiments of the present invention, however, may only illuminate one frame on the bar code 350 (e.g., with the first illumination source 310) and capture the frame with the camera 320, unless the presence of specular reflection is detected.

For example, the imaging scanner's processor may determine when the amplitude of reflected light is above the predetermined amplitude threshold (e.g., when the specular reflection is present). The processor may then turn off the first illumination source 310 and turn on the second illumination source 312 to project the light from a different direction (e.g., the direction 318). As one of ordinary skill in the art will understand, use of the second illumination source 312 projecting light in the different direction 318 may eliminate the specular reflection. Furthermore, using the second illumination source 312 and the second frame only when the specular reflection is detected may allow a user to more quickly scan multiple bar codes in succession.

Figure 4:
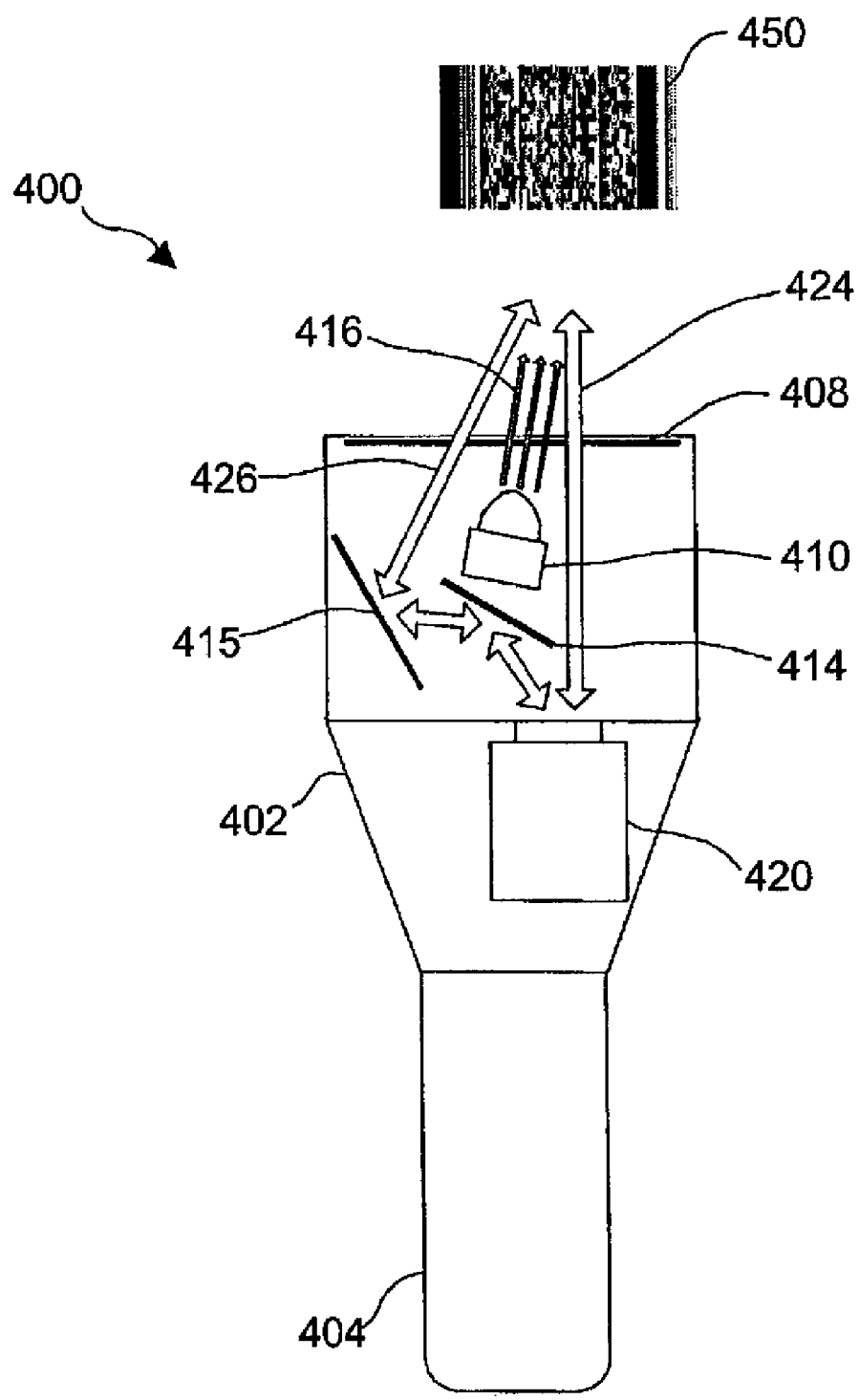
FIG. 4 a perspective view of another exemplary embodiment of an imaging scanner according to the present invention.

FIG. 4 shows another embodiment of an imaging scanner 400 according to the present invention. The imaging scanner 400 may include a housing 402 and, optionally, a handle 404. The imaging scanner 400 may also include a window 408 which may be composed of any substantially transparent material. Within the housing 402, the imaging scanner 400 may include an illumination source 410 which may be, for example, a series of LEDs. The illumination source 410 may direct a substantial portion of light in a first general direction 416 towards a bar code 450 (e.g., a target).

The imaging scanner 400 may include a camera 420 which may be, for example, a digital camera or a CCD. The image scanner 400 may also include a processor (not shown) to process information/data (e.g., images) received by the camera 420.

The imaging scanner 400 may include a first mirror 414 and a second mirror 415 (e.g., reflecting surfaces). The camera 420 and the first and second mirrors 414/416 may be positioned in the housing 402 as to allow the camera 420 to capture a frame including two (2) different views of the bar code 450 (e.g., a split view). For example, camera 420 may record a split view frame including a first viewing direction 424 and a second viewing direction 426. As one of ordinary skill will understand, the imaging scanner 400 may decode the bar code 450 despite specular reflection obstructing the view in either one of the first viewing direction 424 or the second viewing direction 426. The position(s) of the camera 420 and the first and second mirrors 414/416 may also be automatically adjusted by an angle altering arrangement (not shown) in response to specular reflection, thus enabling the imaging scanner 400 to vary the first and second viewing directions 424,426.

Figures 5A, 5B:
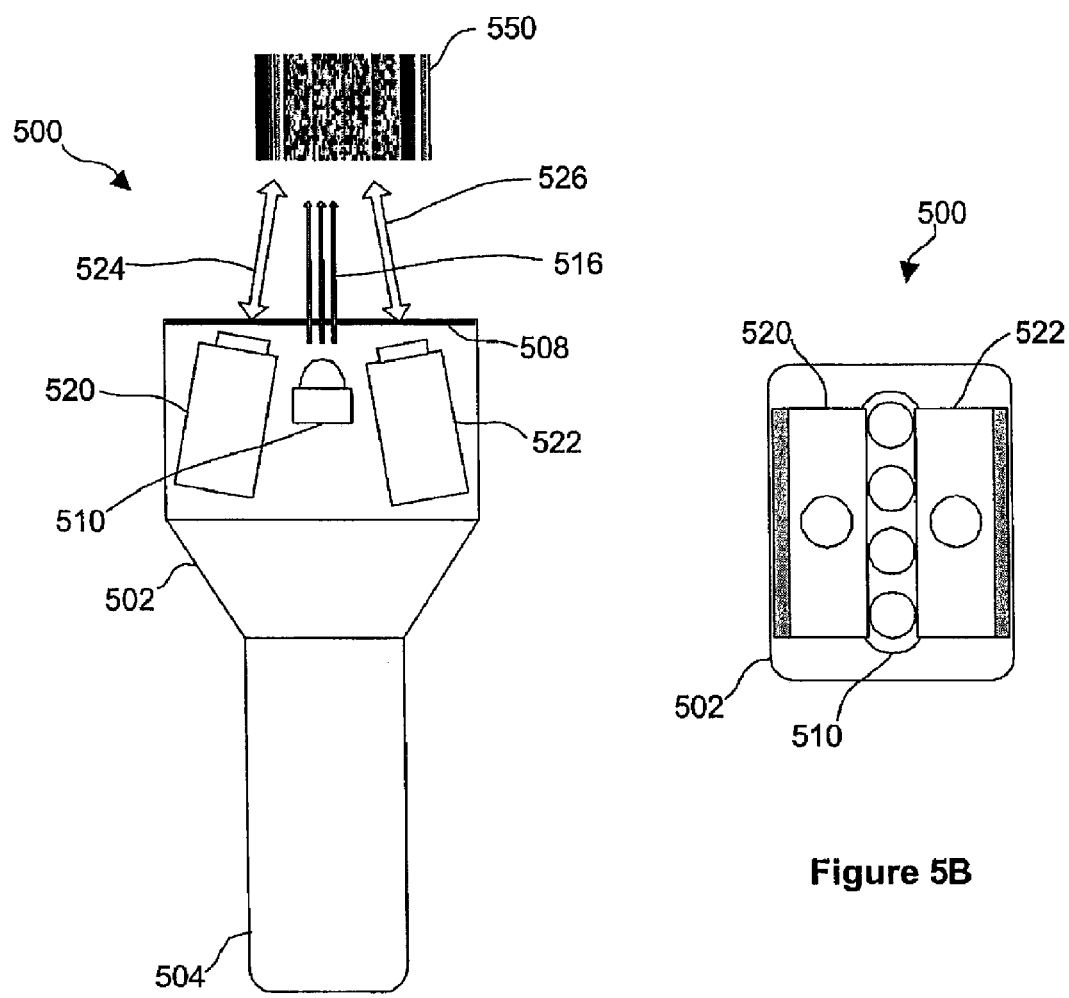
FIG. 5A shows a perspective view of yet another exemplary embodiment of an imaging scanner according to the present invention.
FIG. 5B shows an end view of the exemplary embodiment of the imaging scanner illustrated in FIG. 5A.

FIGS. 5A and 5B show yet another exemplary embodiment of an imaging scanner 500 according to the present invention. Similar to the above-described exemplary embodiments according to the present invention, the imaging scanner 500 may include a housing 502, a handle 504 and a window 508. The imaging scanner 500 may include a first illumination source 510 (e.g., a series of LEDs) projecting light in a first direction 516 towards a bar code 550 (e.g., a target).

The exemplary embodiment shown in FIGS. 5A and 5B may further include a first camera 520 and a second camera 522. The first camera 520 and the second camera 522 may be referred to as an image acquisition system. The first and second cameras 520/522 (e.g., an image acquisition system) may each be, for example, a digital camera or a CCD. The image scanner 500 may also include a processor (not shown) to process information/data (e.g., images) received by the cameras 520/522. The first camera 520 may receive information (e.g., capture a frame) in a first viewing direction 524 and the second camera 522 may receive information in a second viewing direction 526. The first viewing direction 522 is preferably different than the second viewing direction 526.

The imaging scanner 500 may be used to decode or read a bar code 550. The imaging scanner 500 may further be used to read the bar code 550 when the specular reflection is present. For example, the first illumination source 510 may illuminate the bar code 550. The first and second cameras 520/522 may each capture a frame of the bar code 550 from in different viewing directions 524 and 526. For example, a portion of the bar code 550 may be obstructed to the first camera 520 by a specular dead zone (e.g., a section of the bar code unreadable due to specular deflection). The second camera 522, capturing a frame in the different direction 526, may not be obstructed by the specular dead zone. Therefore, the second camera 522 may decode the portion of the bar code 550 obstructed by the specular dead zone in the first camera 520. The processor may compare or stitch together the frames to decode the information stored in the bar code 550.

In other embodiments of the present invention, the imaging scanner 500 may only capture frames with the first camera 520 in the viewing direction 524, unless specular reflection is detected. For example, the imaging scanner's processor may determine when the amplitude of reflected light is above the predetermined amplitude threshold (e.g., when specular reflection is present). The processor may then turn off the first camera 520 and turn on the second camera 522, thus only capturing a frame in the direction 526. As one of ordinary skill in the art will understand, use of the second camera 522 and capturing a frame from the different viewing direction 526 may eliminate the specular reflection. Furthermore, using the second camera 522 and second frame only when specular reflection is detected may allow a user to more quickly scan multiple bar codes in succession.

Figure 6A:
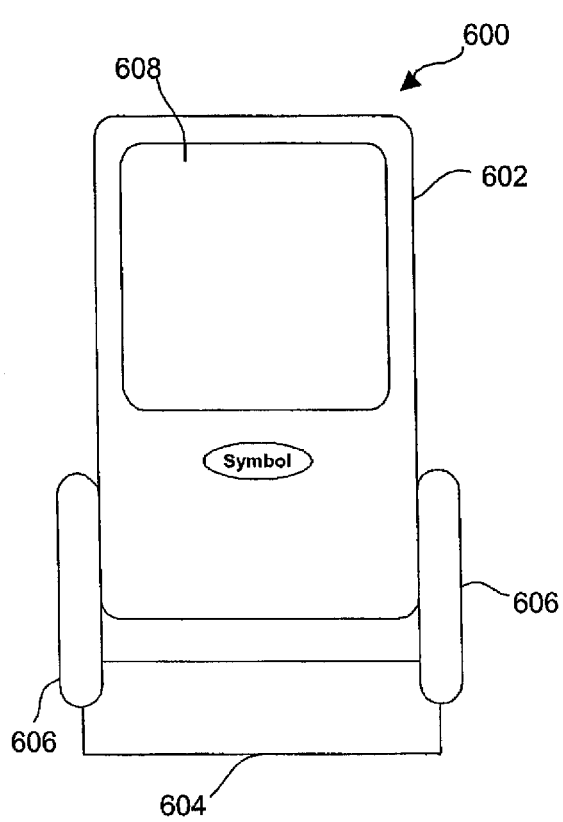
FIG. 6A shows a perspective view of a further exemplary embodiment of an imaging scanner according to the present invention.
Figure 6B:
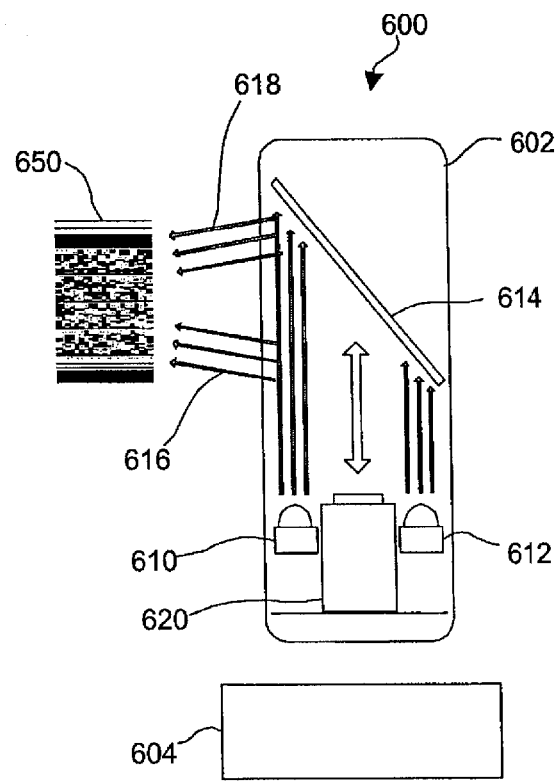
FIG. 6B shows a cross-sectional view of the exemplary embodiment of the imaging scanner illustrated in FIG. 6A.

FIGS. 6A and 6B show another exemplary embodiment of an imaging scanner 600 according to the present invention. The imaging scanner 600 includes a housing 602 which may be of any shape and size, and may be adapted to a specific application. For example, the housing 602 of this exemplary embodiment may be adaptable for both handle-held applications and surface mounted applications. The imaging scanner 600 may include a base 604 which may be rotatably attached to the housing 602 via at least one swivel mount 606. The imaging scanner 600 may also include a window 608.

FIG. 6B shows a cross-sectional view of the exemplary imaging scanner 600 of FIG. 6A. The imaging scanner 600 may include a first illumination source 610 and at least one second illumination source 612. The first and second illumination sources 610/612 may each be a series of LEDs. The image scanner 600 may also include a mirror 614. Each of the first and second illumination source 610/612 may project light at a first portion of the mirror 614 and a second portion of the mirror 614, respectively. The mirror 614 may reflect light from the first illumination source 610 in a first direction 616 and light from the second illumination source in a second direction 618 towards a bar code 650 (e.g., a target). The first direction 616 and the second direction 618 are preferably not equal. For example, light transmitted in the first direction 616 may pass through the window 608 at a different angle (i.e., with reference to the window 608) than light transmitted in the second direction 618.

The imaging scanner 600 may include a camera 620 and a processor (not shown). The camera 620 may be positioned between the first illumination source 610 and the second illumination source 612 in the housing 602. The camera 620 may capture frames of (i.e., receive information from) the bar code 650. As discussed above, the camera 620 may capture one frame of the bar code 650 illuminated by the first illumination source 610 or two frames, wherein the first is illuminated by the first illumination source 610 and the second is illuminated by the second illumination source 612.

Figure 7:
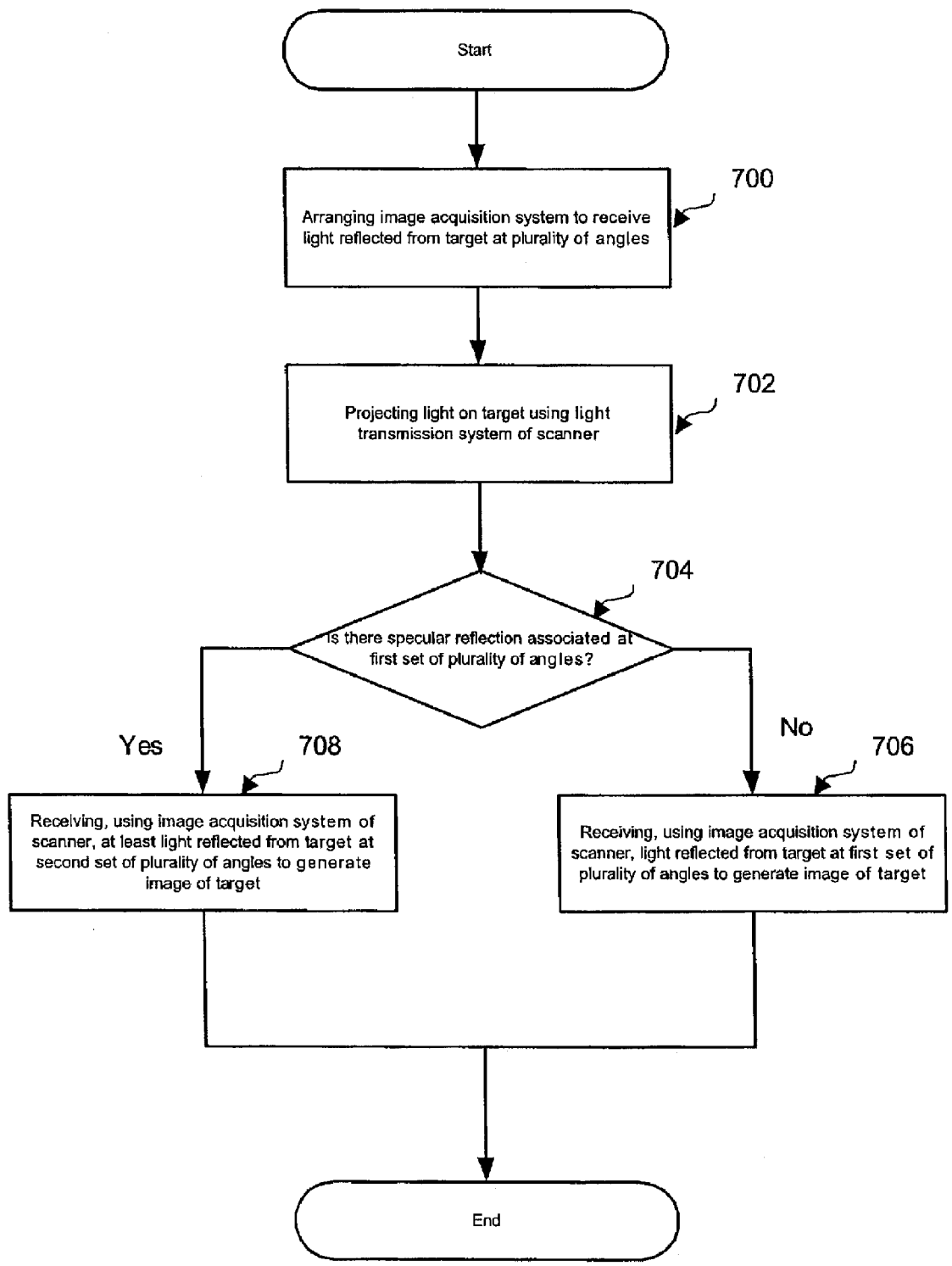
FIG. 7 shows an exemplary embodiment a method according to the present invention.

FIG. 7 shows an exemplary method according to the present invention for eliminating (or at least substantially minimizing) image degradation of a target (e.g., a bar code, an optical code) associated with the specular reflection. The exemplary method described below and shown in FIG. 7 may be applicable and utilized with a plurality of exemplary embodiments of the scanner which are described above and shown in FIGS. 3A, 3B, 4, 5A, 5B, 6A and 6B.

In step 700, the image acquisition system is arranged to receive light reflected from the target at a plurality of angles. For example, as shown in FIGS. 5A and 5B, the first and second cameras 520 and 522 are situated to receive light reflected from the bar code 550 at different viewing directions 524 and 526. In another exemplary embodiment of the present invention shown in FIG. 4 and described above, the first mirror 414 and the second mirror 415 are situated in such a way so that the camera 420 may receive light reflected from the bar code 450 at different viewing directions 424 and 426.

In step 702, the light transmission system (e.g., the first and second illumination sources 310, 312) projects/illuminates the target (e.g., the bar code 350). In step 704, the processor of the scanner makes a determination if there is a specular reflection associated with a first set of the plurality of angles.

If there is no specular reflection, the image acquisition system of the scanner receives the light reflected from the target at the first set of the plurality of angles (step 706). However, if there is a specular reflection, the image acquisition system of the scanner receives (as a substitution or an addition) the light reflected from the target at a second set of the plurality of angles so that image degradation associated with e specular reflection may be completely eliminated or at least substantially minimize (step 708). In such a case, the processor may generate an image of the target based on (i) the light reflected from the target at the second set of the plurality of angles or (ii) the light reflected from the target at the first and second sets of the plurality of angles. For example, if the specular reflection of the bar code is determined at the first direction 524, then the second camera 522 receives light from the bar code 550 from the second direction 526.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A scanner for reading an optical code, comprising:
   a light transmission component projecting light on a target and including at least a first light source and a second light source;
   at least one mirror; and
   an image acquisition component receiving light reflected from the target to generate a first image of the target, wherein the image acquisition component:
   activates the first light source to produce the first image and determines whether a specular reflection of the target is present in the first image,
   if the specular reflection is determined to be present in the first image, deactivates the first light source and activates the second light source to project light from the second light source on the target at a second angle of incidence different than a first angle of incidence of the light from the first light source,
   produces a second image from light of the second light source that is reflected from the target, and
   produces a composite image from the first image and the second image that eliminates the specular reflection, wherein the at least one mirror reflects the light onto the target at the first angle of incidence and the second angle of incidence.

2. The scanner according to claim 1, wherein:
   the first light source includes a first set of LEDs,
   the second light source includes a second set of LEDs,
   the first set of LEDs is arranged nearer to a first side of the image acquisition component, and
   the second set of LEDs is arranged nearer to a second side of the image acquisition component.

3. The scanner according to claim 1, wherein the image acquisition component determines the presence of the specular reflection by determining that an amplitude of the light reflected from the target exceeds a predetermined threshold.

4. The scanner according to claim 1, wherein the optical code is a bar code.

5. The scanner according to claim 1, wherein the scanner is a portable bar code scanner.

6. A scanner for reading an optical code, comprising:
 a light transmission component projecting light on a target and including a first set of light sources; and
 at least one mirror; and
 an image acquisition component including a first camera and a second camera, the first camera receiving light reflected from the target at a first angle and the second camera receiving light reflected from the target at a second angle different than the first angle, wherein the image acquisition component:
  produces a first image of the target code from the light received at the first angle and a second image of the target code from the light received at the second angle, and
  if specular reflection is present in the first image, the image acquisition component decodes that portion of the second image that corresponds to a portion of the first image obscured by the specular reflection, wherein the at least one mirror reflects light from the first set of light sources onto the target at different angles of incidence.

7. The scanner according to claim 6, wherein the optical code is a bar code.

8. The scanner according to claim 6, wherein the scanner is a portable bar code scanner.

9. The scanner according to claim 6, wherein each of the first camera and the second camera includes one of a digital camera and a CCD.

10. The scanner according to claim 6, wherein the first set of light sources is located in between the first camera and the second camera.

11. The scanner according to claim 6, wherein:
 if the image acquisition component detects the specular reflection in the first image, the image acquisition component deactivates the first camera and activates the second camera so that the image acquisition component uses only the second image to decode the optical code.

12. A scanner for reading an optical code, comprising:
 a light transmission component projecting light on a target and including a first light source and a second light source;
 at least one reflecting surface; and
 an image acquisition component including a first camera, wherein:
  the first reflecting surface directs light from the first light source and the second light source to the target,
  the first reflecting surface directs light reflected from the target to the first camera,
  the image acquisition component captures a first image of the target illuminated by the first light source and captures a second image of the target illuminated by the second light source, and
  if the image acquisition component determines that the first image includes specular reflection, the image acquisition component decodes the optical code based on the second image, wherein the at least one reflecting surface reflects light from the first light source onto the target at a first angle of incidence, and wherein the at least one reflecting surface reflects light from the second light source onto the target at a second angle of incidence that is different than the first angle.

13. The scanner according to claim 12, wherein the optical code is a bar code.

14. The scanner according to claim 12, wherein the scanner is a portable bar code scanner.

15. The scanner according to claim 12, wherein the first camera includes one of a digital camera and a CCD.

16. A method for reading an optical code, comprising:
 activating a first light source of a scanner to project light on a target by reflecting the light from at least one mirror, the at least one mirror reflecting the light onto the target at a first angle of incidence;
 generating a first image of the target from light reflected from the target;
 determining whether a specular reflection is present in the first image;
 if the specular reflection is determined to be present in the first image, deactivating the first light source and activating a second light source of the scanner to project light from the second light source on the target at a second angle of incidence different than the first angle of incidence of the light from the first light source, the light from the second light source being reflected from the at least one mirror onto the target at the second angle of incidence;
 generating a second image of the target from the light of the second light source that is reflected from the target; and
 producing a composite image from the first image and the second image that eliminates the specular reflection.

17. A system for reading an optical code, comprising:
 means for activating a first light source of a scanner to project light on a target by reflecting the light from at least one mirror, the at least one mirror reflecting the light onto the target at a first angle of incidence;
 means for generating a first image of the target from light reflected from the target;
 means for determining whether a specular reflection is present in the first image;
 means for if the specular reflection is determined to be present in the first image, deactivating the first light source and activating a second light source of the scanner to project light from the second light source on the target at a second angle of incidence different than the first angle of incidence of the light from the first light source, the light from the second light source being reflected from the at least one mirror onto the target at the second angle of incidence;
 means for generating a second image of the target from the light of the second light source that is reflected from the target; and
 means for producing a composite image from the first image and the second image that eliminates the specular reflection.

18. The scanner according to claim 1, wherein the at least one mirror includes a first mirror and a second mirror, the first mirror reflecting the light from the first light source, and the second mirror reflecting the light from the second light source.

19. The scanner according to claim 1, wherein the at least one mirror includes only a single mirror, a first region of the single mirror reflecting the light from the first light source, and a second region of the single mirror reflecting the light from the second light source.

* * * * *